United States Patent
Muraki et al.

(10) Patent No.: US 6,227,182 B1
(45) Date of Patent: May 8, 2001

(54) EXHAUST GAS RECIRCULATION CONTROL SYSTEM FOR INTERNAL COMBUSTION ENGINE

(75) Inventors: Hirotada Muraki, Yokohama; Sadayuki Yonetamari, Kanagawa, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/326,704

(22) Filed: Jun. 7, 1999

(30) Foreign Application Priority Data

Jun. 9, 1998 (JP) .................................................. 10-160152
Jun. 9, 1998 (JP) .................................................. 10-160971

(51) Int. Cl.$^7$ .................................................. F02M 25/07
(52) U.S. Cl. ...................................... 123/568.21; 701/108
(58) Field of Search .......................... 123/568.11, 568.19, 123/568.21, 568.23, 568.24, 568, 26; 701/108

(56) References Cited

U.S. PATENT DOCUMENTS

| | | | |
|---|---|---|---|
| 4,279,235 | * 7/1981 | Flaig et al. | 123/568.21 |
| 4,999,781 | * 3/1991 | Holl et al. | 701/108 |
| 5,878,717 | * 3/1999 | Zur Loye | 701/108 |
| 5,921,223 | * 7/1999 | Fukuma | 701/108 |
| 5,934,249 | * 8/1999 | Nanba et al. | 701/108 |
| 6,012,431 | * 1/2000 | Itoyama et al. | 123/568.21 |
| 6,019,094 | * 2/2000 | Itoyama | 701/108 |
| 6,098,602 | * 8/2000 | Martin et al. | 701/108 |

FOREIGN PATENT DOCUMENTS 59-74364  4/1984  (JP).
60-230555  11/1985  (JP).

* cited by examiner

Primary Examiner—Willis R. Wolfe
(74) Attorney, Agent, or Firm—Foley & Lardner

(57) ABSTRACT

An exhaust gas recirculation control system for an internal combustion engine comprises sensors detecting operating conditions of the engine, an air-flow meter detecting an actual intake-air flow rate, an exhaust-gas-recirculation passage connecting an exhaust manifold with an intake manifold, an exhaust-gas-recirculation control valve device disposed in the exhaust-gas-recirculation passage for regulating an EGR rate. An electronic control unit is electronically connected to the sensors and the exhaust-gas-recirculation control valve device. The control unit arithmetically calculates a basic EGR rate as a function of a first predetermined engine operating condition containing engine speed and load, and calculates a first correction factor as a function of a second predetermined engine operating condition, such as engine coolant temperature, and estimates an intake-air flow rate from the first predetermined engine operating condition, the basic EGR rate, and the first correction factor, and calculates a second correction factor from a ratio of the actual intake-air flow rate to the intake-air flow rate estimated for feedback-correction to the basic EGR rate. The control unit interrelatively makes a first EGR-rate correction based on the first correction factor and a second EGR-rate correction based on the second correction factor with respect to the basic EGR rate to produce the final desired EGR rate, and then executes EGR control on the basis of the final desired EGR rate.

15 Claims, 9 Drawing Sheets

EXHAUST GAS RECIRCULATION CONTROL SYSTEM FOR INTERNAL COMBUSTION ENGINE

BACKGROUND OF THE INVENTION

1. Field of the Invention

The present invention relates to the improvements of an exhaust gas recirculation control system for an internal combustion engine, particularly to techniques for feedback-controlling an exhaust gas recirculation rate depending upon a flow rate of intake air flowing through an air-intake pipe on diesel engines.

2. Description of the Prior Art

In order to minimize atmospheric pollution, specifically nitrogen oxide ($NO_x$) emissions, from automotive vehicles, there have been proposed and developed various automotive tune-up and exhaust-emission control techniques. An exhaust-gas-recirculation control system, often abbreviated to "EGR system", is used to reduce $NO_x$ emissions from exhaust gases of the internal combustion engine by way of the fall of combustion temperature, caused by recycling of some of the inert exhaust gas back through an intake manifold. One such EGR system has been disclosed in Japanese Patent Provisional Publication No. 60-230555. On one hand, EGR is useful to decrease the formation of $NO_x$. On the other hand, undesiredly excessive EGR deteriorates combustion, thus dropping engine power output, and also reducing driveability of the vehicle. In recent years, it is desirable to achieve high-precision EGR control in due consideration of various factors, namely (i) engine temperature (during cold engine start, during warming-up period, or in the engine warmed-up state), (ii) the reduced effective opening of an EGR control valve occurring owing to lubricating oil (engine oil) or a product of combustion (carbon deposits) adhered to the EGR control valve, (iii) changes in an intake-air flow rate occurring due to changes in air density, arising from changes in environment from low-land driving to high-land driving under constant engine speed and load, and (iv) the delay in boost pressure (often called "turbo-lag") on turbo-charged engines in a transient state, such as in a transition from normal-straight ahead driving to heavy vehicle acceleration. To avoid the problem of deviation from a desired EGR rate, resulting from changes in the intake-air flow rate occurring due to the drop in air density from low-land driving to high-land driving, Japanese Patent Provisional Publication No. 59-74364 proposes to feedback-control a desired EGR rate on the basis of a detected value of an actual flow rate of intake air flowing through an intake-air pipe of an induction system of a diesel engine.

SUMMARY OF THE INVENTION

In order to achieve the previously-noted high-precision EGR control, it is necessary to correct or compensate for an EGR rate or an EGR amount (an opening of an EGR control valve) depending on various engine operating conditions (engine temperature for example engine coolant temperature, automatic transmission oil temperature, or the like, a fuel-injection timing, atmospheric pressure, and so forth) except engine speed and load, and to execute feedback correction for the EGR rate depending on changes in an actual intake-air flow rate. Assuming that an EGR rate is corrected depending on engine temperature such as engine coolant temperature, an intake-air flow rate also varies owing to the corrected EGR rate. Therefore, it is necessary to estimate the intake-air flow rate varied, and to correct the EGR rate (or the opening of the EGR control valve) while comparing the estimated intake-air flow rate with an actual intake-air flow rate. According to a typical method for correcting the opening of the EGR control valve, a plurality of characteristic maps each showing the relationship among a basic intake-air flow rate and engine operating conditions such as engine speed and load, for each engine-coolant-temperature dependent EGR-control-valve-opening correction value, must be first prepared. Second, a correction factor for the EGR control valve opening is calculated on the basis of a rate of the basic intake-air flow rate, which is interpolated and corrected by the engine-coolant-temperature dependent EGR-control-valve-opening correction value, to an actual intake-air flow rate (or the actual volume of air flowing into the engine cylinders) actually measured or detected by means of an air flow meter. Third, a desired EGR control valve opening, which is calculated on the basis of engine speed and load, is finally corrected by the calculated correction factor for the EGR control valve, to execute feedback control, so that the opening of the EGR control valve is adjusted toward the finally-corrected desired opening. In the previously-described method for correcting the EGR control valve opening, a plurality of characteristic maps must be prepared for each engine coolant temperature and be stored in memories of an electronic control unit with a microcomputer, since the engine coolant temperature dependent EGR-control-valve-opening correction and the EGR control valve opening correction based on changes in the intake-air flow rate would be made independently of each other. This results in an undesirably large amount of data stored in the memories (containing a fixed-data memory and an operating-data memory). Additionally, there is the problem of more complicated interpolation and arithmetic calculations owing to a plurality of corrections made independently of each other. Furthermore, a plurality of characteristic maps different from each other for every sorts of internal combustion engines must be prepared. This induces the problem of reduced flexibility in different types of internal combustion engine.

Accordingly, it is an object of the invention to provide an exhaust gas recirculation (EGR) control system for internal combustion engines which avoids the aforementioned disadvantages of the prior art.

It is another object of the invention to provide an exhaust gas recirculation control system for internal combustion engines, in which a first EGR-rate correction (or a first EGR-valve-opening correction) and a second EGR-rate feedback correction (or a second EGR-valve-opening feedback-correction) based on the result of comparison between the actual intake-air flow rate and the estimated intake-air flow rate are interrelatively simply made to the desired EGR rate as a series of EGR rate control procedures.

It is a further object of the invention to provide an exhaust gas recirculation control system for internal combustion engines having enhanced flexibility in different types of internal combustion engine, by virtue of simple arithmetic calculations or estimations needed for deriving an intake-air flow rate varied due to a first desired-EGR-rate correction being made to a basic EGR rate (the basic EGR rate being based on a first predetermined engine operating condition indicative parameter including at least one of engine speed and engine load), on the basis of a second predetermined engine operating condition indicative parameter (the engine temperature, the fuel-injection timing, the atmospheric pressure or the like) except the first predetermined engine operating condition indicative parameter, and by virtue of a second desired-EGR-rate correction made in response to the deviation of the estimated intake-air flow rate from an actual intake-air flow rate.

In order to accomplish the aforementioned and other objects of the present invention, an exhaust gas recirculation control system for an internal combustion engine equipped with an exhaust-gas recirculation system that recycles part of inert exhaust gas back through the engine, comprises sensors detecting operating conditions-of the engine, an air-flow meter detecting an actual intake-air flow rate, an exhaust-gas-recirculation passage adapted to connect an exhaust manifold with an intake manifold, an exhaust-gas-recirculation control valve device disposed in the exhaust-gas-recirculation passage for regulating an EGR rate, and a control unit configured to be electronically connected to the sensors and the exhaust-gas-recirculation control valve device for automatically regulating the EGR rate to a final desired EGR rate, the control unit comprising a basic EGR rate arithmetic-calculation section arithmetically calculating a basic EGR rate as a function of a first predetermined engine operating condition of the operating conditions, a first correction factor arithmetic-calculation section arithmetically calculating a first correction factor for the basic EGR rate as a function of a second predetermined engine operating condition of the operating conditions except the first predetermined engine operating condition, a basic intake-air flow rate arithmetic-calculation section arithmetically calculating a basic intake-air flow rate as a function of the first predetermined engine operating condition, a corrected intake-air flow rate arithmetic-calculation section estimating a corrected intake-air flow rate from the basic EGR rate, the basic intake-air flow rate and the first correction factor, a second correction factor arithmetic-calculation section arithmetically calculating a second correction factor by comparison of the corrected intake-air flow rate estimated by the corrected intake-air flow rate arithmetic-calculation section with the actual intake-air flow rate detected by the air-flow meter for executing feedback-correction with respect to the basic EGR rate, a final desired EGR rate arithmetic-calculation section arithmetically calculating the final desired EGR rate as a product of the basic EGR rate, the first correction factor, and the second correction factor, and an EGR control section executing exhaust-gas recirculation control on the basis of the final desired EGR rate, so that the EGR rate is regulated to the final desired EGR rate.

According to another aspect of the invention, an exhaust gas recirculation control system for an internal combustion engine equipped with an exhaust-gas recirculation system that recycles part of inert exhaust gas back through the engine, comprises sensors detecting operating conditions of the engine, an air-flow meter detecting an actual intake-air flow rate, an exhaust-gas-recirculation passage adapted to connect an exhaust manifold with an intake manifold, an exhaust-gas-recirculation control valve device disposed in the exhaust-gas-recirculation passage for regulating an EGR rate, and a control unit configured to be electronically connected to the sensors and the exhaust-gas-recirculation control valve device for automatically regulating the EGR rate to a final desired EGR rate, the control unit comprising a basic EGR rate arithmetic-calculation section arithmetically calculating a basic EGR rate as a function of a first predetermined engine operating condition indicative parameter of the operating conditions, a first correction factor arithmetic-calculation section arithmetically calculating a first correction factor for the basic EGR rate as a function of a second predetermined engine operating condition indicative parameter of the operating conditions except the first predetermined engine operating condition indicative parameter, a basic intake-air flow rate arithmetic-calculation section arithmetically calculating a basic intake-air flow rate as a function of the first predetermined engine operating condition indicative parameter, a basic intake-air flow rate correction factor arithmetic-calculation section arithmetically calculating a basic intake-air flow rate correction factor as a function of both the basic EGR rate and the first correction factor under a particular condition where a totally-induced gas flow rate, defined as a sum of an induced fresh-air flow rate and a quantity of exhaust gas recirculated, is kept constant, a volumetric-efficiency correction factor arithmetic-calculation section arithmetically calculating a volumetric-efficiency dependent intake-air flow rate correction factor corresponding to a change in volumetric efficiency, occurring owing to the EGR rate affected by the first correction factor, as a function of the first correction factor, a final intake-air flow rate correction factor arithmetic-calculation section arithmetically calculating a final intake-air flow rate correction factor as a product of the basic intake-air flow rate correction factor and the volumetric-efficiency dependent intake-air flow rate correction factor, a corrected intake-air flow rate arithmetic-calculation section arithmetically calculating a corrected intake-air flow rate as a product of the basic intake-air flow rate and the final intake-air flow rate correction factor, a second correction factor arithmetic-calculation section arithmetically calculating a second correction factor for the basic EGR rate by comparison of the corrected intake-air flow rate with the actual intake-air flow rate, a final desired EGR rate arithmetic-calculation section arithmetically calculating the final desired EGR rate as a product of the basic EGR rate, the first correction factor, and the second correction factor, and an EGR control section executing exhaust-gas recirculation control on the basis of the final desired EGR rate, so that the EGR rate is regulated to the final desired EGR rate.

According to a further aspect of the invention, in an internal combustion engine equipped with an exhaust-gas recirculation system that recycles part of inert exhaust gas back through the engine, an exhaust gas recirculation control system for executing exhaust-gas recirculation control, comprises a sensor means for detecting operating conditions of the engine, an air-flow meter for detecting an actual intake-air flow rate during EGR addition, an exhaust-gas-recirculation passage means for connecting an exhaust manifold with an intake manifold, an exhaust-gas-recirculation control valve means disposed in the exhaust-gas-recirculation passage means for regulating an EGR rate, and an EGR control means configured to be electronically connected to the sensor means and the exhaust-gas-recirculation control valve means for automatically regulating the EGR rate to a final desired EGR rate, the EGR control means comprising a basic EGR rate arithmetic-calculation section arithmetically calculating a basic EGR rate as a function of a first predetermined engine operating condition of the operating conditions, a first correction factor arithmetic-calculation section arithmetically calculating a first correction factor for the basic EGR rate as a function of a second predetermined engine operating condition of the operating conditions except the first predetermined engine operating condition, an intake-air flow rate estimation section estimating an intake-air flow rate from the first predetermined engine operating condition, the basic EGR rate, and the first correction factor, a second correction factor arithmetic-calculation section arithmetically calculating a second correction factor by comparison of the intake-air flow rate estimated by the intake-air flow rate estimation section with the actual intake-air flow rate detected by said air-flow meter for executing feedback-correction with respect to the basic EGR rate, an EGR rate correction section interrelatively making a first EGR-rate correction based on the first correction factor and a second EGR-rate correction based on the second correction factor with respect to the basic EGR rate to produce the final desired EGR rate, and an EGR control section executing exhaust-gas recirculation control on the basis of the final desired EGR rate, so that the EGR rate is regulated to the final desired EGR rate.

According to a still further aspect of the invention, a method for controlling exhaust-gas recirculation of an internal combustion engine, wherein the engine includes an exhaust-gas recirculation system recycling part of inert exhaust gas back through the engine and having an exhaust-gas-recirculation passage adapted to connect an exhaust manifold with an intake manifold and an exhaust-gas-recirculation control valve device disposed in the exhaust-gas-recirculation passage for regulating an EGR rate, sensors detecting operating conditions of the engine, an air-flow meter detecting an actual intake-air flow rate, and an electronic control unit configured to be electronically connected to the sensors and the exhaust-gas-recirculation control valve device for automatically regulating the EGR rate to a final desired EGR rate, the method comprises arithmetically calculating a basic EGR rate as a function of a first predetermined engine operating condition of the operating conditions, arithmetically calculating a first correction factor for the basic EGR rate as a function of a second predetermined engine operating condition of the operating conditions except the first predetermined engine operating condition, estimating an intake-air flow rate from the first predetermined engine operating condition, the basic EGR rate, and the first correction factor, arithmetically calculating a second correction factor by comparison of the intake-air flow rate estimated by the intake-air flow rate estimation section with the actual intake-air flow rate detected by the air-flow meter, for executing feedback-correction with respect to the basic EGR rate, interrelatively making a first EGR-rate correction based on the first correction factor and a second EGR-rate correction based on the second correction factor with respect to the basic EGR rate to produce the final desired EGR rate, and executing exhaust-gas recirculation control on the basis of the final desired EGR rate, so that the EGR rate is regulated to the final desired EGR rate.

DESCRIPTION OF THE PREFERRED EMBODIMENTS

Figure 1:
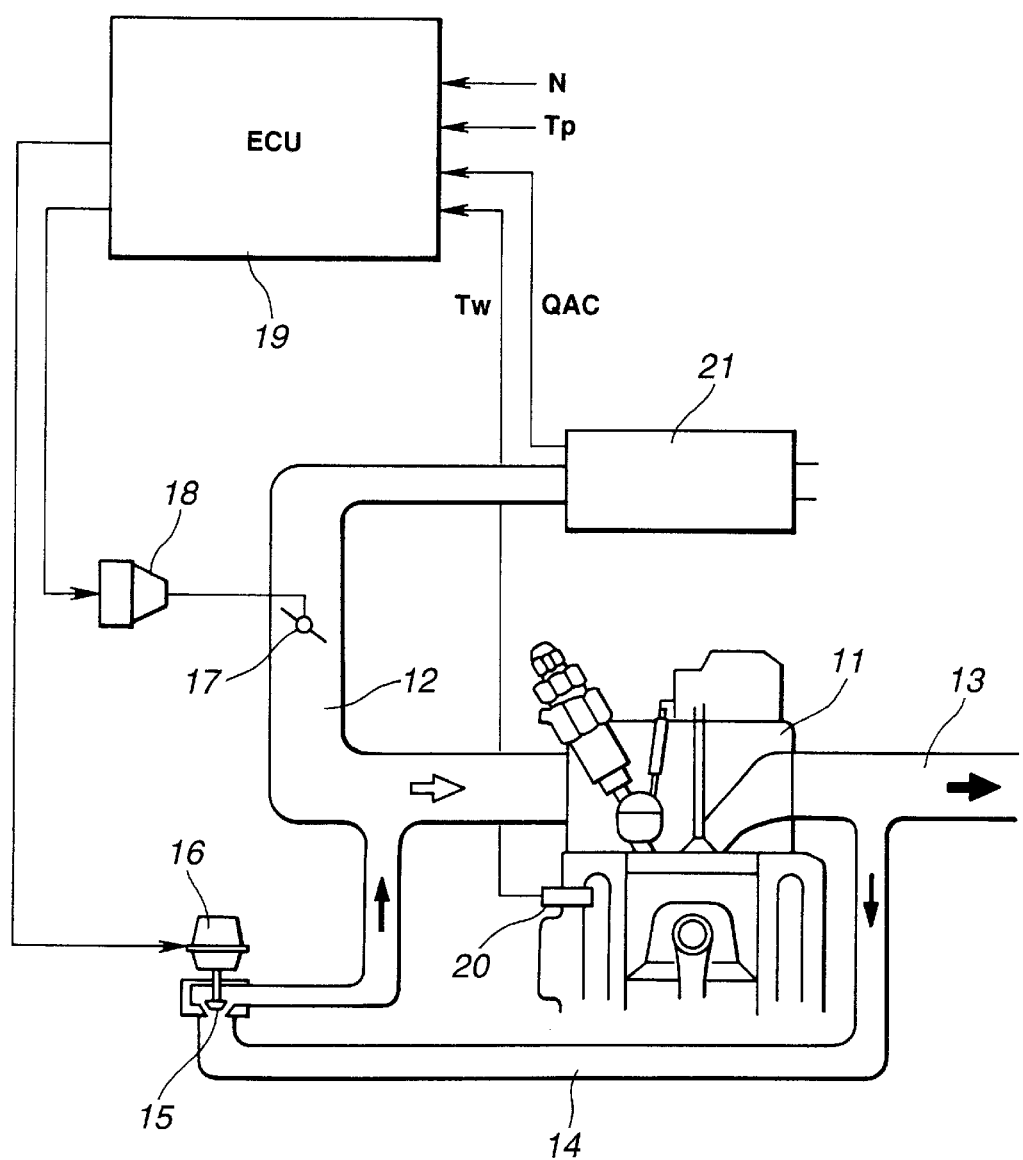
FIG. 1 is a system diagram illustrating one embodiment of an exhaust gas recirculation control system (abbreviated to "EGR" system) of the invention.
Figure 7:
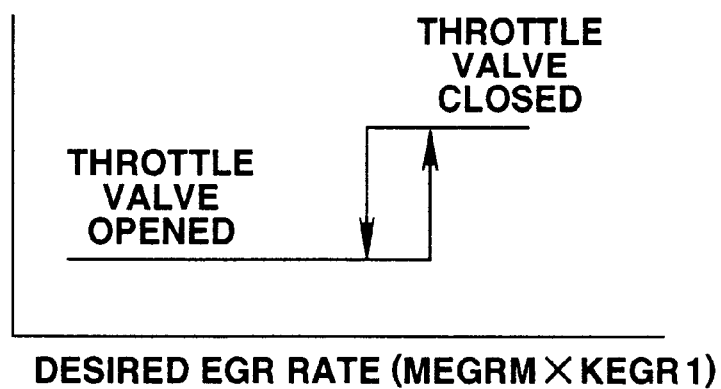
FIG. 7 is a characteristic map data illustrating the relationship between a throttle valve opening and a desired EGR rate (MEGRM×KEGR1) corrected by the first correction factor (KEGR1).

Referring now to the drawings, particularly to FIG. 1, the exhaust gas recirculation control system of the invention is exemplified in an automotive diesel engine electronically connected to an electronic concentrated engine control system (ECCS) or an electronic engine control unit (ECU) being capable of monitoring various engine/vehicle parameters through a number of engine/vehicle sensors, to control various systems, such as an electronic fuel injection control system, an electronic ignition system, and to ensure that the exhaust emissions and fuel economy standards are maintained. As seen in FIG. 1, the EGR control system of the embodiment includes an exhaust gas recirculation (abbreviated simply as "EGR") passage 14 which connects an air-intake passage or an intake manifold 12 with an exhaust-gas passage or an exhaust manifold 13 of the engine 11. An EGR control valve 15 is fluidly disposed in the middle of the EGR passage 14. The EGR passage 13 and the EGR control valve 15 are provided to send some of the exhaust gas back through the intake manifold, thereby reducing the production of oxides of nitrogen ($NO_x$) at the exhaust system. The opening and closing of the EGR control valve 15 is controlled by means of an actuator 16. The EGR control valve 15 and the actuator 16 constructs an EGR control valve device. The actuator 16 usually comprises a stepper motor (also known as a "stepping motor" or a "step-servo motor"). The actuator (or the stepper motor) 16 is connected via a signal line to the output interface or a drive circuit of the ECU 19, so that the angular steps or essentially uniform angular movements of the actuator 16 can be obtained electromagnetically depending on a control signal or a drive signal which is output from the output interface of the ECU 19 and indicative of a desired opening of the EGR control valve 15. That is, the command value of the EGR-control-valve opening is arithmetically calculated as a desired number of angular steps of the step motor. By increasing the number of angular steps, the EGR control valve opening, simply the EGR valve opening, can be controlled substantially continually from the full-open position to the fully-closed position. On the other hand, a throttle valve 17 is disposed in the air-intake passage 12 upstream of the confluent point between the outlet port of the EGR passage 14 and the air-intake passage 12. As seen in FIG. 1, the throttle valve 17 is usually comprised of a butterfly valve. The opening and closing of the throttle valve 17 is controlled by means of an actuator 18. The throttle valve 17 and the actuator 16 constructs a throttle valve device. Similarly to the actuator 16 connected to the EGR control valve 15, the actuator 18 connected to the throttle valve 17 may comprise a stepper motor. The actuator 18 is connected via a signal line to the output interface of the ECU, so that the angular steps of the actuator 18 can be obtained electromagnetically depending on a control signal output from the output interface of the ECU 19. Alternatively, the throttle valve 17 may comprise a vacuum-operated butterfly-type throttle valve which is linked to a vacuum-operated mechanism which consists of a diaphragm unit and an electromagnetic solenoid valve, so that the angular position or the opening of the throttle valve 17 is adjusted by way of the vacuum fed into the diaphragm chamber of the diaphragm unit through the electromagnetic solenoid valve, the opening and closing of which can be electronically controlled in response to a control signal from the output interface of the ECU 19. Actually, the throttle valve 17 is operated at two operating modes, namely an open mode position and a closed mode position (see FIG. 7), depending on a desired EGR rate (MEGRM×KEGR1) primarily corrected by a first correction factor KEGR1 which will be fully described later. Also, the EGR control valve 15 and the throttle valve 17 cooperate with each other to properly regulate the quantity of exhaust gas recirculated so that the amount of $NO_x$ is reduced at various engine operating conditions, such as at high loads, at low speeds, during starting and warming up from cold, or in a transient state (in presence of environmental variation) from low-land driving to high-land driving. For example, under a certain engine operating condition where a large amount of EGR is required, the throttle valve 17 is shifted to a valve position as close to its closed position as possible in order to produce a negative pressure in the air-intake pipe downstream of the throttle valve 17, whereas the EGR control valve 15 is regulated or adjusted to a desired EGR control valve opening based on the certain engine operating condition. Conversely, when less EGR is required or there is no necessity for EGR, the throttle valve 17 is shifted to its full-open position corresponding to the open mode position. As may be appreciated, with the throttle valve 17 maintained at the closed mode position, the differential pressure between a pressure in the exhaust system (simply an exhaust pressure) and a pressure in the induction system including the intake manifold and the collector is enlarged to the maximum, thereby facilitating recirculation of the exhaust gas. Details of the electronic control unit (ECU) 19 are described hereunder.

As appreciated from the system diagram shown in FIG. 1, the ECU 19 comprises a microcomputer containing a memory (ROM, RAM), an input/output interface (or input interface circuitry and output interface circuitry), and a central processing unit (CPU). The memory is generally designed to store informational data from the input and output interfaces, preprogrammed characteristic map data, and the results of ongoing arithmetic calculations. The input/output interface is the device that allow data to be transferred between input and output devices, CPU and the memory. Output signals from the input/output interface are amplified to operate electrical loads, namely the throttle valve actuator 18 and the EGR control valve actuator 16. The memory (ROM) prestores the characteristic maps shown in FIGS. 5A–5D, 6, 7 and 8. Arithmetic and logic sections of the CPU perform necessary arithmetic calculations shown in FIGS. 2 and 3 or shown in FIGS. 2 and 9. The output interface of the ECU 19 is connected to the throttle-valve actuator 18 and the EGR-control-valve actuator 16. On the other hand, the input interface of the ECU 19 is connected to various engine/vehicle sensors, for receiving an engine-speed indicative signal N, a basic fuel-injection amount indicative signal Tp, an engine temperature indicative signal Tw from an engine coolant temperature sensor (a water temperature sensor) 20, and an actual intake-air flow rate indicative signal QAC from an air-flow meter 21. The air-flow meter 21 comprises a hot-wire mass air flow meter which is located in the air-intake passage 12 upstream of the throttle valve 17. The air-flow meter 21 is provided for detecting an actual flow rate QAC of fresh air passing through an air cleaner (not shown). The engine speed data N and the basic fuel-injection amount indicative input information data Tp (regarded as a representative value of engine load) are generally used as fundamental engine operating parameters needed for determining the fuel-injection amount and fuel-injection timing. The input information data N and Tp are also used for determination of a desired EGR rate (MEGRM) and correction or compensation for the desired EGR rate (MEGRM).

Figure 2:
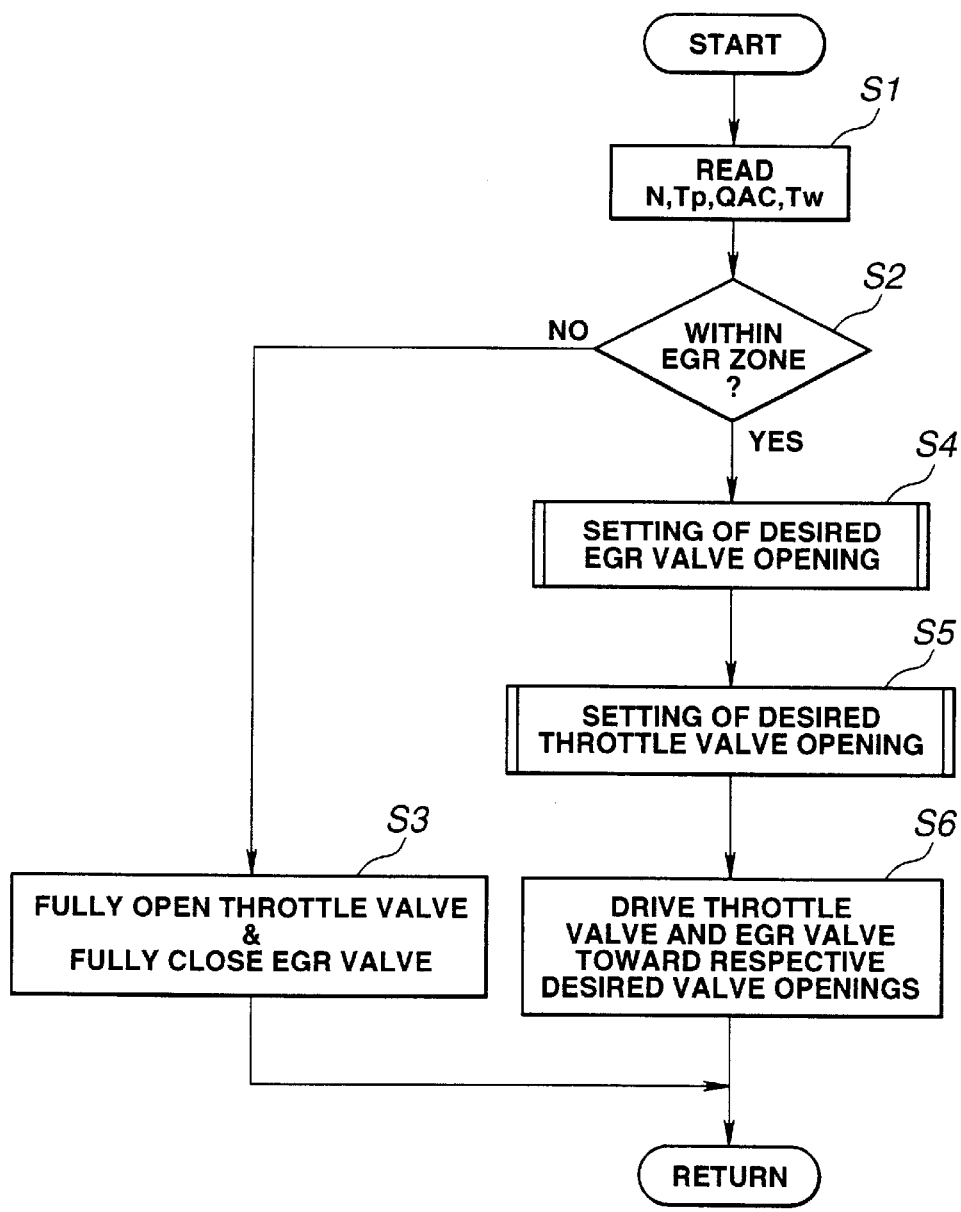
FIG. 2 is a flow chart illustrating a main routine or a main program for an EGR control routine executed by a microcomputer employed in the electronic control unit (ECU) shown in FIG. 1.
Figure 3:
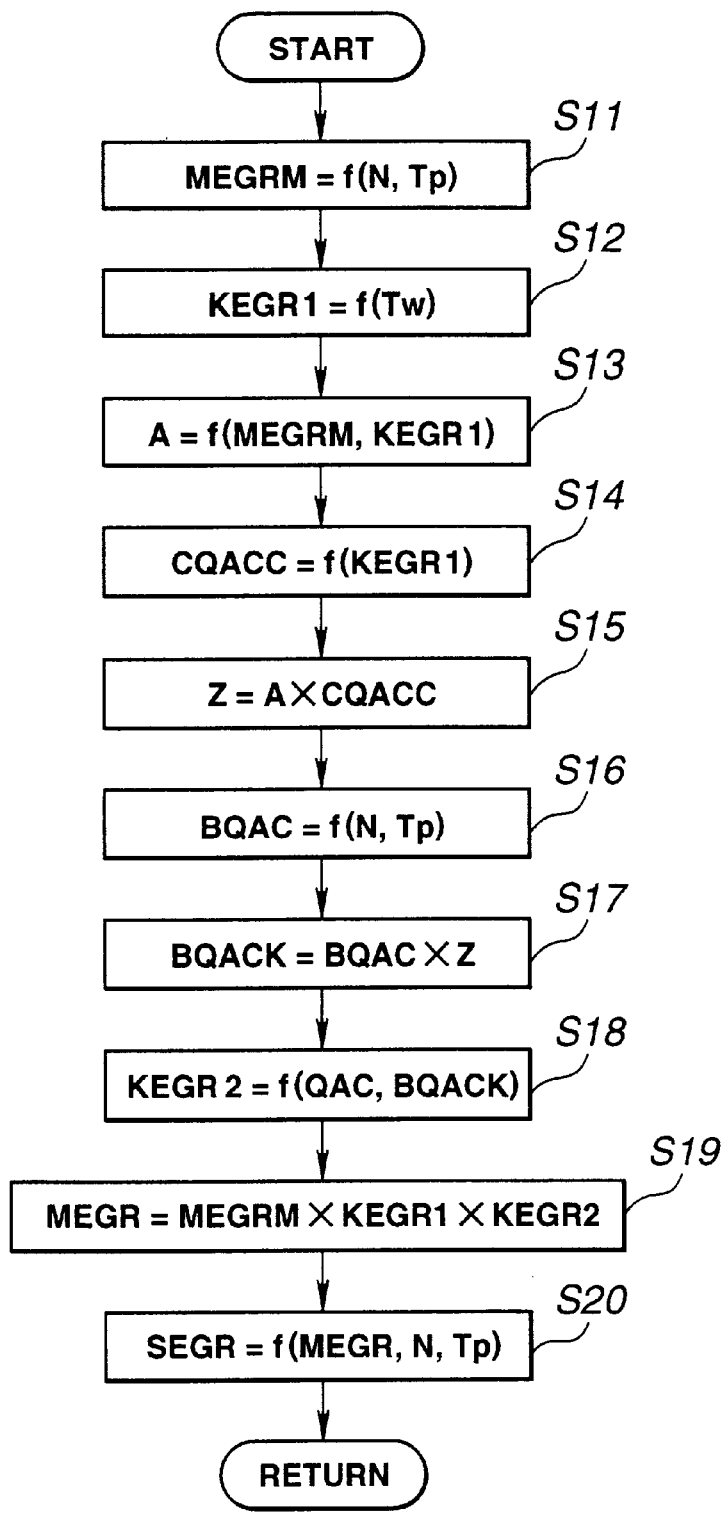
FIG. 3 is a flow chart illustrating a sub-routine for the EGR control routine.

Referring now to FIGS. 2 and 3, there are shown EGR-control-valve-opening control routines executed by the EGR control system of the invention. These routines of FIGS. 2 and 3 are cyclically executed as time-triggered interrupt routines to be triggered every predetermined intervals such as several milliseconds or several 10 milliseconds.

In step S1 of FIG. 2, the input information data, namely the engine speed data N, the basic fuel-injection amount data Tp, the actual intake-air flow rate data QAC, and the engine coolant temperature data Tw and the like are read. In step S2, on the basis of the input information data N, Tp, QAC and Tw extracted, a test is made to determine whether these informational data are within respective EGR permission zones (see the zones or ranges indicated by "YES" in FIGS. 5A–5D). When the answer to step S2 is in the negative (NO), that is, the processor of the ECU determines that the engine 11 is running at high loads or at low speeds, or the engine is started from cold, or the engine is warming up (see the EGR inhibition zones or ranges indicated by "NO" in FIGS. 5A–5D), step S3 occurs. In step S3, the throttle valve 17 is rapidly adjusted to the full-open position, whereas the EGR control valve 15 is rapidly adjusted to the fully-closed position, so as to inhibit EGR. To the contrary, when the answer to step S2 is in the affirmative (YES), that is, the processor of the ECU determines that the input informational data (N, Tp, QAC, Tw) are in the corresponding EGR permission zones, the procedure flows from step S2 through steps S4 and S5 to step S6. In step S4, a desired opening (SEGR) of the EGR control valve 15 (a desired EGR valve opening) is properly set or determined in accordance with the sub-routine (see FIGS. 3 or 9) needed to arithmetically calculate or compute the EGR valve opening. In step S5, a desired opening of the throttle valve 17 is properly set or determined or retrieved from the preprogrammed or predetermined characteristic map (see FIG. 7) on the basis of a desired EGR rate (MEGRM×KEGR1) primarily corrected by the first correction factor KEGR1 discussed later. Thereafter, in step S6, the output interface of the ECU outputs control signals to the EGR-control-valve actuator 16 and the throttle-valve actuator 18, so that the desired EGR valve opening (SEGR) and the desired throttle valve opening are obtained.

Figure 6:
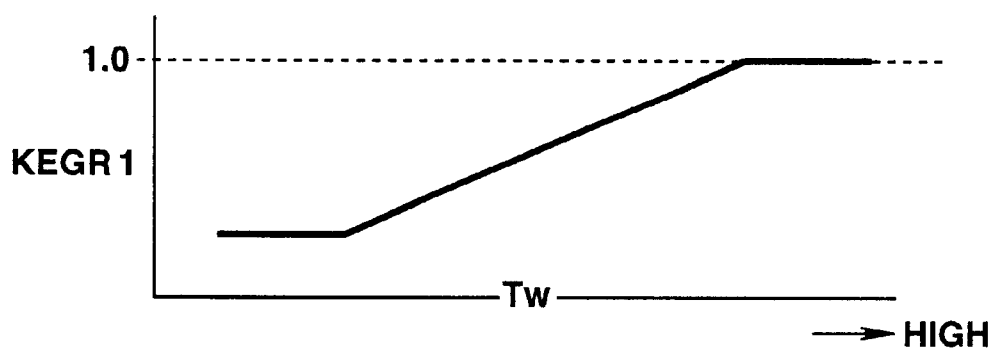
FIG. 6 is a characteristic map data illustrating the relationship between the engine coolant temperature value (Tw) and a first correction factor (KEGR1).

FIG. 3 shows the EGR control sub-routine corresponding to step S4 of FIG. 2. In step S11 of FIG. 3, a basic value (MEGRM) of the desired EGR rate (simply the basic EGR rate) is arithmetically calculated by way of retrieval from a preprogrammed three-dimensional characteristic map representative of the relationship among the engine speed N, the basic fuel-injection amount Tp (equivalent to the engine load), and the basic EGR rate MEGRM. In step S12, the first correction factor KEGR1, which is used for primarily correcting or compensating for the basic EGR rate (MEGRM) on the basis of a predetermined operating parameter (such as the engine coolant temperature Tw) except engine speed and load, is derived or retrieved as a function f(Tw) of the engine coolant temperature Tw from a predetermined or preprogrammed two-dimensional characteristic map as shown in FIG. 6. As is generally known, there is the problem of increased cylinder-wall wear occurring owing to carbon deposits adhered to the engine cylinder wall by exhaust gas flow recirculated particularly at low engine temperatures. Thus, the water temperature (Tw) versus first-correction-factor (KEGR1) characteristic map of FIG. 6 is designed to decrease the first correction factor KEGR1 as the water temperature Tw (regarded as the engine temperature) lowers, in such a manner as to set the first correction factor KEGR1 at a predetermined minimum value during the start of the engine from cold, and to gradually rise the first correction factor KEGR1 up to 1.0 according to the increase of the water temperature, and to set the first correction factor KEGR1 at the maximum value (i.e., 1.0) after the engine has been warmed up. In the shown embodiment, the first correction factor KEGR1 is defined as a coefficient with which the basic EGR rate MEGRM is multiplied, and thus the first correction factor KEGR1 is preprogrammed as a value less than or equal to "1". Also, in the shown embodiment, although the engine coolant temperature Tw is used as the predetermined operating parameter except engine speed and load, which parameter is needed for determining the first correction factor KEGR1, the other operating parameter such as fuel-injection timing, atmospheric pressure or the like may be used as the predetermined operating parameter except engine speed and load. As may be appreciated, the intake-air flow rate tends to vary owing to the EGR rate varied or primarily corrected or affected by the first correction factor KEGR1. Thus, in step S13, a basic intake-air flow rate correction factor A is arithmetically calculated as a rate of change in a basic intake air flow rate (precisely a basic induced fresh-air flow rate per cylinder BQAC) based on the engine speed (N) and load (Tp), under a particular condition where a totally-induced gas flow rate (the induced fresh-air flow rate plus quantity of exhaust gas recirculated) is kept constant. In the embodiment, the basic intake-air flow rate correction factor A is arithmetically calculated as a function f(MEGRM, KEGR1) on the basis of both the basic EGR rate MEGRM and the first correction factor KEGR1, from the following first expression (1) or the following second expression (2). When the EGR rate is defined as a ratio of the exhaust-gas-recirculation amount (EGR amount) to the intake-air flow rate (the induced fresh-air flow rate), the first expression (1) is used. When the EGR rate is defined as a ratio of the EGR amount (the quantity of exhaust gas recirculated) to the totally-induced gas flow rate (the induced fresh-air flow rate plus the EGR amount), the second expression (2) is used.

$$A=(1+MEGRM)/(KEGR1 \times MEGRM+1) \quad (1)$$

$$A=(1-KEGR1 \times MEGRM)/(1-MEGRM) \quad (2)$$

Actually, the totally-induced gas flow rate (defined as the sum of an induced fresh-air flow rate per cylinder and an EGR amount per cylinder) varies as the EGR rate varies due to the first correction factor KEGR1. However, the rate of change in the totally-induced gas flow rate has a generally regular or steady tendency with respect to the rate of change in the EGR rate under such an operating condition that EGR is being added or diverted into the engine at least without deterioration of combustion. Therefore, it is unnecessary to verify or determine as to how the totally-induced gas flow rate is affected by variations in the EGR rate all over the operating conditions of the engine. For the reasons set out above, a volumetric-efficiency correction factor CQACC can be determined on the basis of the tendencies of the rate of change in the totally-induced gas flow rate, occurring due to changes in the EGR rate under the specified operating condition that EGR is being added or diverted into the engine at least without deterioration of combustion. The volumetric-efficiency correction factor CQACC means a volumetric-efficiency dependent intake-air flow rate correction factor corresponding to a change in the volumetric efficiency, taking place owing to the EGR rate varied or primarily corrected by the first correction factor KEGR1. Thus, a characteristic map for the volumetric-efficiency dependent intake-air flow rate correction factor CQACC is preprogrammed in the form of a two-dimensional characteristic map utilizing only the first correction factor KEGR1 as a parameter. In other words, the volumetric-efficiency dependent intake-air flow rate correction factor CQACC is represented as a function f(KEGR1) of the first correction factor KEGR1. Actually, in step S14, the previously-discussed volumetric-efficiency correction factor CQACC is retrieved from the preprogrammed two-dimensional characteristic map, on the basis of the first correction factor KEGR1 obtained through step S12. In step S15, a final correction factor Z for the basic intake-air flow rate BQAC is computed or calculated by the following expression (3).

$$Z=A \times CQACC \quad (3)$$

where A denotes the basic intake-air flow rate correction factor A, and CQACC denotes the volumetric-efficiency dependent intake-air flow rate correction factor.

As seen in the expression (3), the final intake-air flow rate correction factor Z is defined as the product of the two correction factors A and CQACC. In step S16, the basic intake-air flow rate BQAC is arithmetically calculated or estimated on the basis of two parameters used for arithmetic-calculation for the basic EGR rate MEGRM, namely the engine speed data N and the engine load data Tp (the basic fuel-injection amount indicative input information data) extracted through step S1. In arithmetically calculating the basic intake-air flow rate BQAC, the same engine speed and load data as used for arithmetic-calculation for the basic EGR rate MEGRM is used. That is to say, the basic intake-air flow rate BQAC corresponds to an intake-air flow rate obtained when EGR is executed at the basic EGR rate based on the same engine speed (N) and load (Tp). Therefore, the basic intake-air flow rate BQAC is retrieved as a function f(N, Tp) of the engine speed and load from the preprogrammed three-dimensional characteristic map showing the specified relationship among the engine speed N and the engine load Tp, and the basic intake-air flow rate BQAC. In step S17, the basic intake-air flow rate BQAC is corrected or estimated on the basis of the final intake-air flow rate correction factor Z (=A×CQACC) from the following expression (4).

$$BQACK=BQAC \times Z \quad (4)$$

Figure 8:
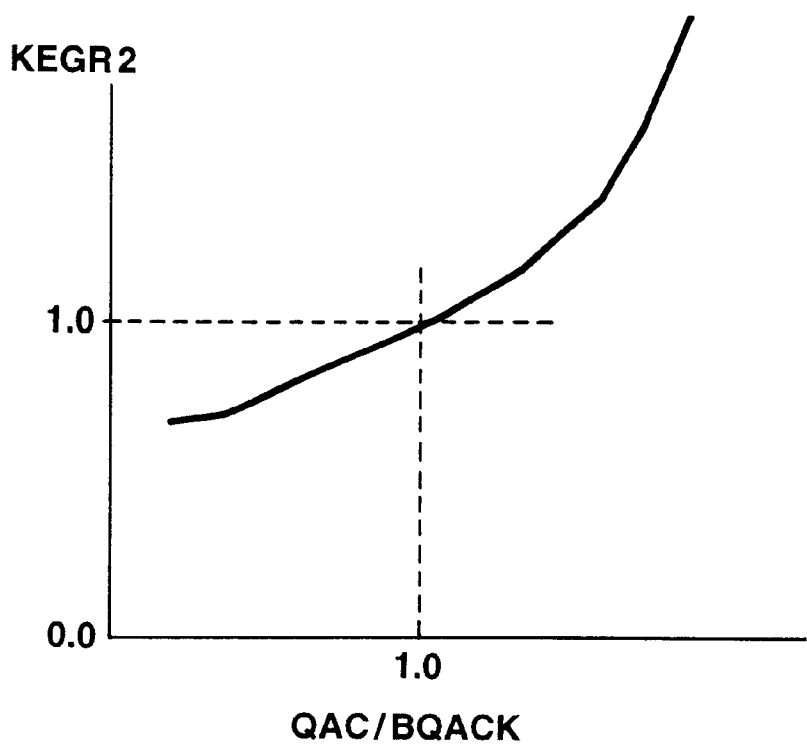
FIG. 8 is a characteristic map data illustrating the relationship between a second correction factor (KEGR2) and a ratio (QAC/BQACK) of the actual intake-air flow rate (QAC) to the corrected or estimated intake air flow rate (BQACK).

In step S18, a second correction factor or a feedback correction factor KEGR2 for the basic EGR rate (MEGRM) is arithmetically calculated or estimated as a function f(QAC, BQACK) of the actual intake-air flow rate QAC measured or detected by the air-flow meter 21 and the corrected target intake-air flow rate BQACK. Actually, the second correction factor KEGR2 is retrieved from a preprogrammed characteristic map representative of the relationship between the second correction factor KEGR2 and the ratio QAC/BQACK of the actual intake-air flow rate QAC to the corrected target intake-air flow rate BQACK. FIG. 8 shows an example of the preprogrammed second correction factor (KEGR2) versus ratio (QAC/BQACK) characteristic map. As seen in FIG. 8, the second correction factor KEGR2 is designed to increase substantially proportionally as the ratio QAC/BQACK increases. This is because, under a particular condition where the EGR valve opening is fixed to a constant value, when the actual intake-air flow rate QAC exceeds the corrected target intake-air flow rate BQACK, the EGR rate tends to reduce. Also, as seen in FIG. 8, when the actual intake-air flow rate QAC is equal to the corrected target intake-air flow rate BQACK, that is, the ratio QAC/BQACK is 1.0, the second correction factor KEGR2 is set at 1.0. Alternatively, in order to more precisely determine the second correction factor KEGR2, it is possible to extend from the preprogrammed two-dimensional characteristic map (KEGR2=f(QAC/BQACK)) shown in FIG. 8 to a three-dimensional characteristic map (KEGR2=f(QAC/BQACK, N)) preprogrammed or predetermined within the tolerance for the memory capacities, accounting for the engine speed data N as well as the ratio QAC/BQACK. That is, the second correction factor KEGR2 may be retrieved from a preprogrammed three-dimensional characteristic map (KEGR2=f(QAC/BQACK, N)), since the second correction factor KEGR2 is dependent on the engine speed data N as well as the change in the intake-air flow rate (i.e., the ratio QAC/BQACK). In step S19, a final desired EGR rate MEGR is arithmetically calculated in accordance with the following expression (5).

$$MEGR = MEGRM \times KEGR1 \times KEGR2 \quad (5)$$

In step S20, the desired EGR valve opening SEGR of the EGR control valve 15 is arithmetically calculated on the basis of the final desired EGR rate MEGR, the engine speed data N, and the engine load data Tp (the basic fuel-injection amount indicative data). That is, the desired EGR valve opening SEGR is preprogrammed as a function f(MEGR, N, Tp) of the three parameters MEGR, N and Tp. The control signal based on the desired EGR valve opening SEGR is output from the ECU 19 to the EGR-control-valve actuator 16, so that the actual opening of the EGR control valve 15 is adjusted to the desired EGR valve opening SEGR.

Figure 4:
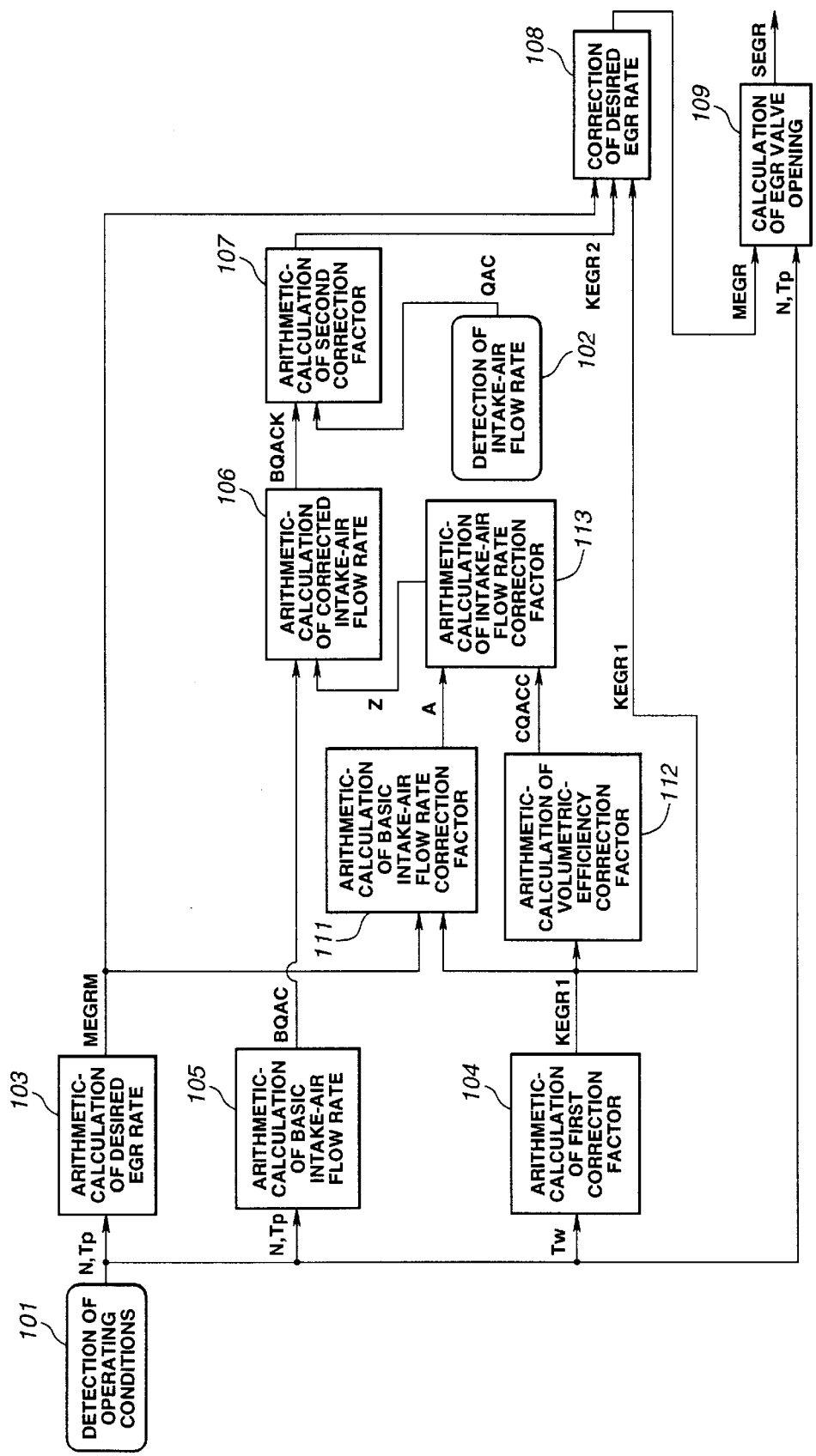
FIG. 4 is an operational block diagram explaining the function and construction of the EGR control system of the invention.
Figure 5A:
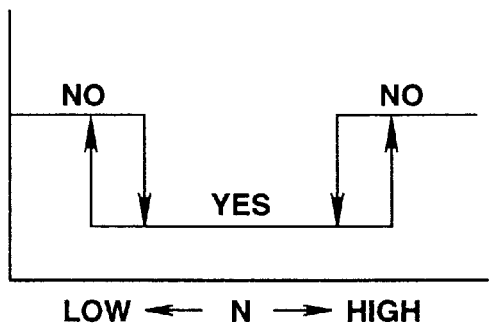
FIGS. 5A, 5B, 5C and 5D show necessary EGR control characteristic maps used to determine the necessity for EGR respectively depending on engine speed (N), a basic fuel injection amount (Tp), an actual intake-air flow rate (QAC) measured, and an engine coolant temperature value (Tw).
Figure 5B:
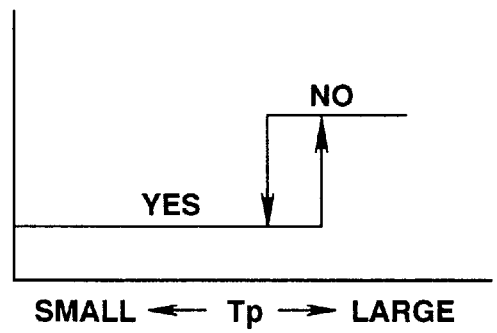
Figure 5C:
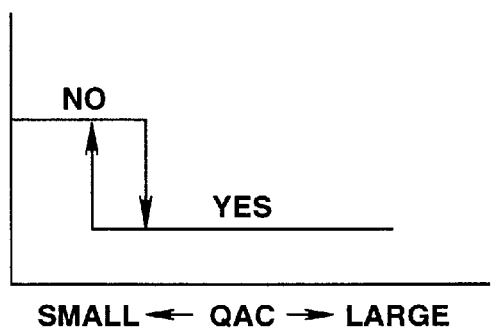
Figure 5D:
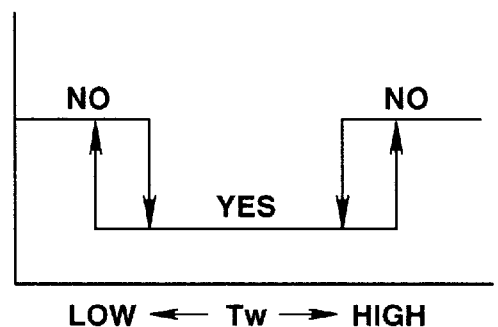

Referring now to FIG. 4, there is shown the simplified operational block diagram explaining a series of correction procedures containing the EGR-rate feedback correction (the estimation of second correction factor KEGR2) based on the result of comparison between the actual intake-air flow rate QAC and the corrected target intake air-flow rate BQACK. As seen in FIG. 4, in the system of the embodiment, first, the engine operating conditions (N, Tp, Tw, and the like) are detected (see the block 101). Secondly, the basic EGR rate MEGRM is arithmetically calculated on the basis of first predetermined engine operating conditions (N, Tp) containing engine speed and load (see the block 103), and additionally the basic intake-air flow rate BQAC is arithmetically calculated or estimated on the basis of the same engine operating conditions (the same engine speed and load), so that the basic intake-air flow rate is determined by or interrelated with the basic EGR rate MEGRM (see the block 105). Thirdly, the first correction factor KEGR1 for the basic EGR rate MEGRM is arithmetically calculated on the basis of a certain engine operating condition or a second predetermined engine operating condition (such as the engine temperature Tw) except the previously-noted first predetermined engine operating conditions (N, Tp) containing engine speed and load (see the block 104). Fourthly, the basic intake-air flow rate correction factor A is arithmetically calculated on the basis of both the basic EGR rate MEGRM and the first correction factor KEGR1 (see the block 111), under a particular condition where a totally-induced gas flow rate (defined as the sum of the induced fresh-air flow rate and the exhaust-gas-recirculation amount) is kept constant, and at the same time the volumetric-efficiency dependent intake-air flow rate correction factor CQACC is arithmetically calculated on the basis of only the first correction factor KEGR1 (see the block 112) such that the volumetric-efficiency correction factor CQACC reflects the change in volumetric efficiency occurring owing to the EGR rate varied or primarily corrected by the first correction factor KEGR1. Thereafter, the final intake-air flow rate correction factor Z is arithmetically computed as the product of the two different intake-air flow rate correction factors A and CQACC (see the block 113). Fifthly, the basic intake-air flow rate BQAC is corrected by the final correction factor Z (see the block 106) to estimate the corrected intake-air flow rate BQACK (=BQAC×Z) which may vary in the event that the basic EGR rate is primarily corrected by the first correction factor KEGR1. Sixthly, in due consideration of the change in the intake-air flow rate based on the first correction factor KEGR1, a so-called feedback correction is executed in such a manner as to arithmetically calculate the second correction factor KEGR2 (see the block 107), while comparing the corrected intake-air flow rate BQACK with the actual intake-air flow rate QAC detected by the air-flow meter 21 (see the block 102). Seventhly, the basic EGR rate MEGRM is finally corrected by both the first and second correction factors KEGR1 and KEGR2 to calculate the final desired EGR rate MEGR (see the block 108). Then, the EGR valve opening command or the EGR-valve-opening control signal SEGR, based on the engine speed (N) and load (Tp), and the final desired EGR rate MEGR, is output (see the block 109).

According to the EGR control system of the embodiment executable the EGR control routines shown in FIGS. 2 and 3, the EGR valve opening of the EGR control valve 15 can be rapidly precisely corrected in response to the change in the intake-air flow rate occurring due to the change in the EGR rate, thus permitting the controlled quantity (the EGR rate) to be quickly precisely brought closer to the desired EGR rate, irrespective of the change in EGR rate and the change in the intake-air flow rate interrelated to each other. Additionally, by virtue of the previously-discussed EGR-rate feedback correction (the second correction factor KEGR2) based on the result (QAC/BQACK) of comparison between the corrected and estimated intake-air flow rate BQACK and the actual intake-air flow rate QAC, it is possible to maintain the required EGR rate (a) in the presence of the reduced effective opening of the EGR control valve 15 occurring owing to oil adhesion or carbon deposits adhered to the EGR control valve, (b) in the presence of the changes in intake-air flow rate occurring owing to positive and negative fluctuations in the throttle valve 17, (c) in the presence of the changes in intake-air flow rate occurring due to changes in air density, arising from changes in environment from low-land driving to highland driving, or (d) in the presence of the delay in boost pressure on turbo-charged engines in a transition from normal-straight ahead driving to heavy vehicle acceleration. Moreover, according to the EGR control system of the invention, the estimation of the intake-air flow rate varied due to the EGR-rate correction based on the first correction factor KEGR1, can be easily precisely performed by a comparatively simple arithmetic expression utilizing the basic EGR rate MEGRM and the first correction factor KEGR1 and by the preprogrammed two-dimensional characteristic map utilizing only the first correction factor KEGR1 as a parameter. Thus, arithmetic load applied to the CPU employed within the ECU 19 can be effectively reduced. Additionally, the system of the invention simply requires a preprogrammed three-dimensional map, which stores data related to the basic intake-air flow rate BQAC (=f(N, Tp)) and a three-dimensional map, which stores data related to the basic EGR rate MEGRM (=f(N, Tp)), and whereby the memory capacities can be reduced to the minimum. As can be appreciated, Man-hour cost required for creating characteristic maps can be also reduced. As discussed above, the system estimates the change in intake-air flow rate, utilizing the basic EGR rate MEGRM, the basic intake-air flow rate BQAC and the first correction factor KEGR1, and additionally the EGR rate or the EGR valve opening is properly quickly corrected by the feedback correction factor KEGR2 as well as the first correction factor KEGR1 interrelatively in response to the change in intake-air flow rate occurring due to the change of EGR rate based on the first correction factor KEGR1. Hitherto, the conventional system has processed the engine coolant temperature dependent EGR-valve-opening correction (or the engine coolant temperature dependent EGR-rate correction) and the EGR-valve-opening correction (or the EGR-rate correction) based on changes in intake-air flow rate independently of each other. On the other hand, in the improved system of the invention, the engine-temperature dependent EGR-valve-opening correction (or the first EGR-rate correction KEGR1) and the EGR-valve-opening feedback correction (or the second EGR-rate feedback correction KEGR2) based on comparison (QAC/BQACK) between the actual intake-air flow rate (QAC) and the estimated intake-air flow rate (BQACK) are interrelatively simply executed as a series of EGR rate control procedures. The system of the invention (having simplified necessary EGR control programs and a small number of arithmetic calculations) is superior to the prior art system (having complicated necessary EGR control programs and a large number of arithmetic calculations) in data processing needed for EGR rate control or EGR-valve-opening control. The system of the invention enables the use of common arithmetic expressions and common characteristic maps even in different types of internal combustion engine, for example a different engine specification (a different displacement or the like), and thus brings enhanced flexibility.

Figure 9:
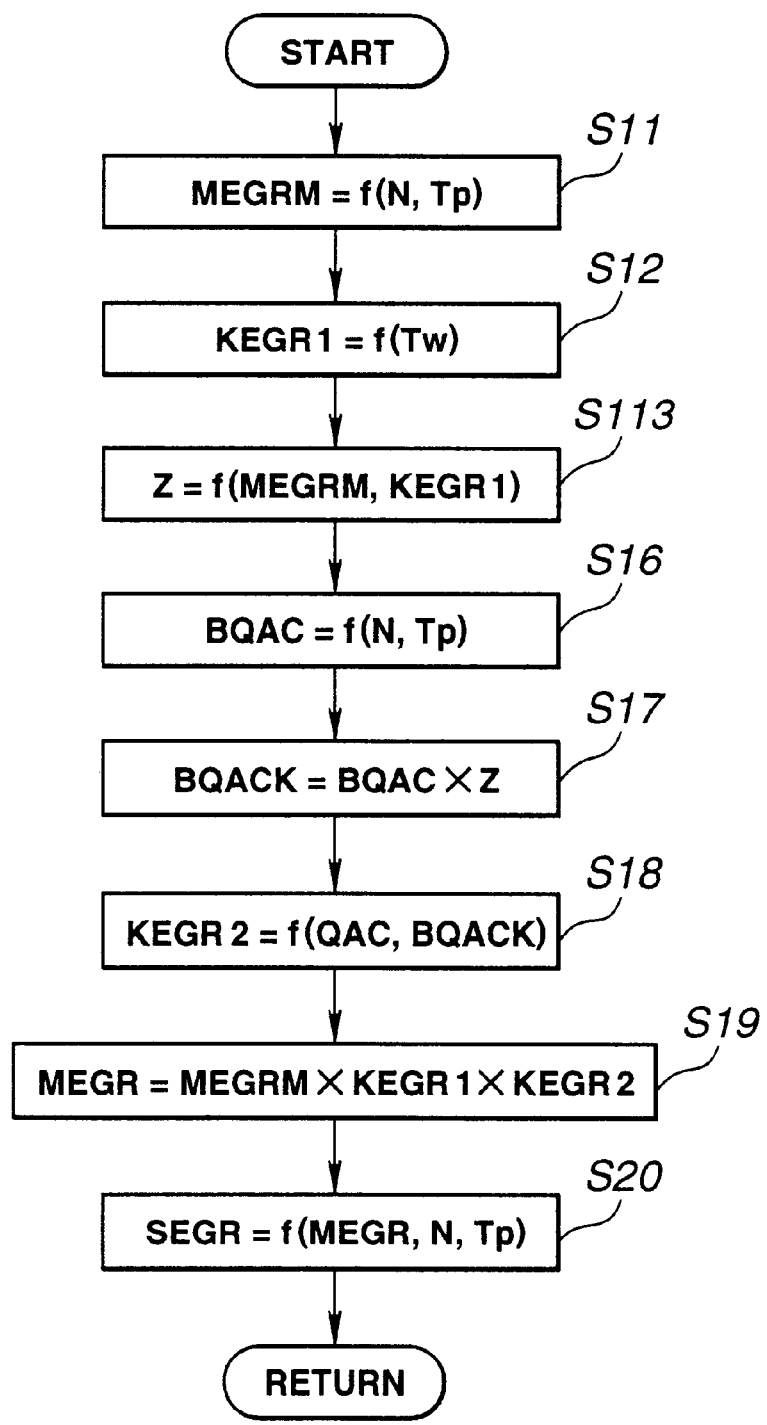
FIG. 9 is a flow chart illustrating a slightly-modified sub-routine for the EGR control routine.

Referring now to FIG. 9, there is shown a modified EGR control sub-routine or arithmetic processing executed by the processor of the microcomputer employed within the ECU 19. The modified arithmetic processing shown in FIG. 9 is also executed as time-triggered interrupt routines to be triggered every predetermined intervals such as several milliseconds or several 10 milliseconds. The modified arithmetic processing of FIG. 9 is similar to the arithmetic processing of FIG. 3, except that steps S13, S14 and S15 included in the sub-routine shown in FIG. 3 are replaced with step S113 included in the sub-routine shown in FIG. 9. Thus, the same step numbers used to designate steps in the routine shown in FIG. 3 will be applied to the corresponding step numbers used in the modified arithmetic processing shown in FIG. 9, for the purpose of comparison of the two different interrupt routines. Step S113 will be hereinafter described in detail with reference to the accompanying drawings, while detailed description of the other steps S11, S12, and S16 through S20, S13 and S14 will be omitted because the above description thereon seems to be self-explanatory.

Figure 10:
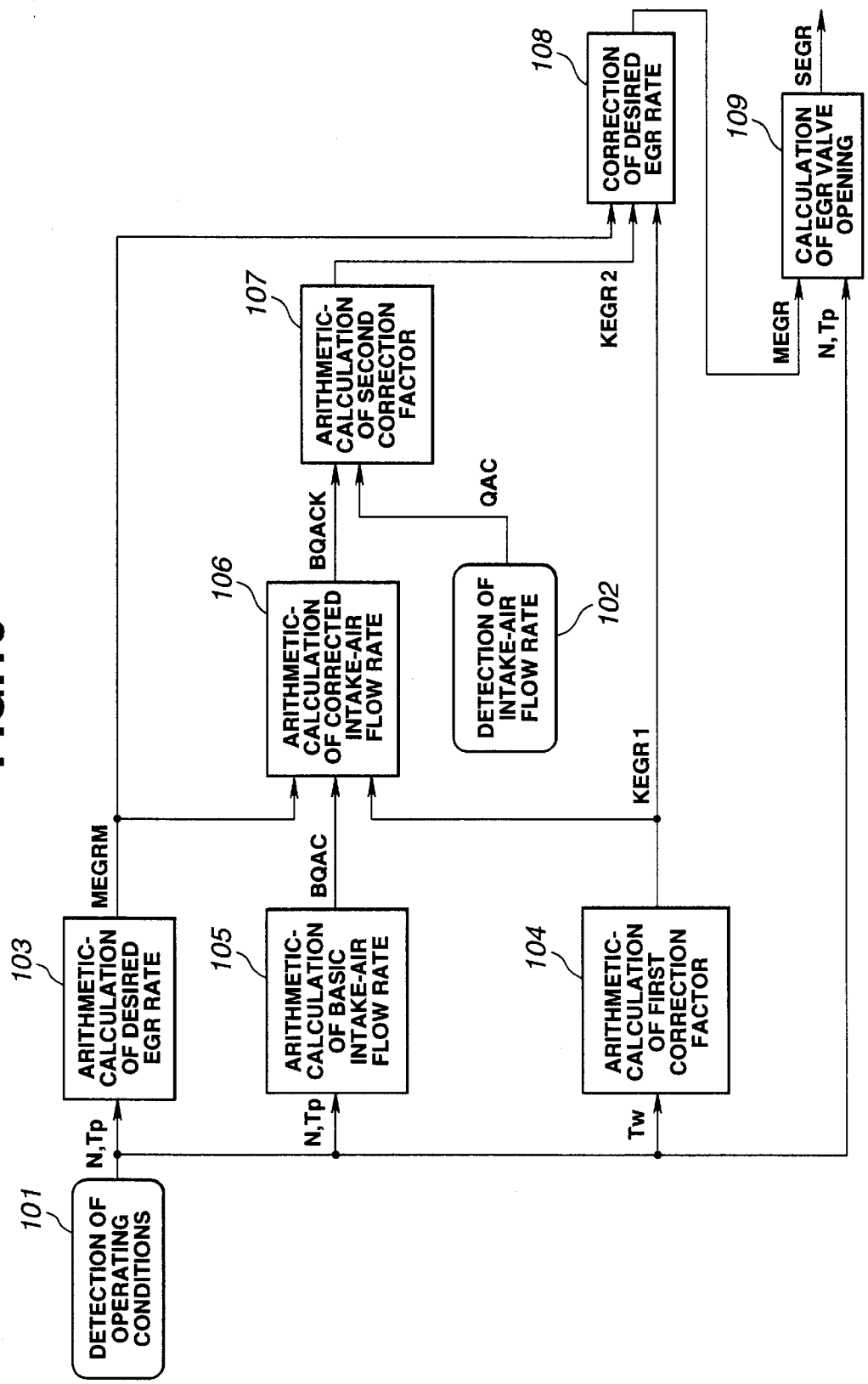
FIG. 10 is a slightly-modified operational block diagram explaining the function and construction of the EGR control system of the invention.

As can be appreciated from comparison between the two sub-routines shown in FIGS. 3 and 9, the modified sub-routine shown in FIG. 9, corresponds to a specific case that the volumetric-efficiency correction factor CQACC is fixed to "1". That is, in the case that the volumetric-efficiency correction factor CQACC is permanently fixed to "1", the final correction factor Z for the basic intake-air flow rate BQAC is constantly equal to the basic intake-air flow rate correction factor A, as appreciated from the expression (3). Thus, an equality Z=A=f(MEGRM, KEGR1) is satisfied. As a consequence, in case of CQACC=1, the arithmetic calculations of steps S13–S15 of FIG. 3 is simply replaced with the relational expression (Z=f(MEGRM, KEGR1)) indicated in step S113 of FIG. 9. In this case, as seen in FIG. 10, the operational block diagram is more simplified rather than that of FIG. 4, and whereby the memory capacities of the arithmetic and logical sections of the CPU can be effectively downsized.

The entire contents of Priority Documents, Japanese Patent Application Nos. P10-160971 (filed Jun. 9, 1998) and P10-160152 (filed Jun. 9, 1998), are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. In an internal combustion engine equipped with an exhaust-gas recirculation system that recycles part of inert exhaust gas back through the engine, an exhaust gas recirculation control system for executing exhaust-gas recirculation control, comprising:

a sensor means for detecting operating conditions of the engine;

an air-flow meter for detecting an actual intake-air flow rate (QAC) during EGR addition;

an exhaust-gas-recirculation passage means for connecting an exhaust manifold with an intake manifold;

an exhaust-gas-recirculation control valve means disposed in said exhaust-gas-recirculation passage means for regulating an EGR rate; and an EGR control means configured to be electronically connected to said sensor means and said exhaust-gas-recirculation control valve means for automatically regulating the EGR rate to a final desired EGR rate; said EGR control means comprising (1) a basic EGR rate arithmetic-calculation section arithmetically calculating a basic EGR rate (MEGRM) as a function of a first predetermined engine operating condition of the operating conditions, (2) a first correction factor arithmetic-calculation section arithmetically calculating a first correction factor (KEGR1) for the basic EGR rate as a function of a second predetermined engine operating condition of the operating conditions except the first predetermined engine operating condition, (3) an intake-air flow rate estimation section estimating an intake-air flow rate (BQACK) from the first predetermined engine operating condition, the basic EGR rate (MEGRM), and the first correction factor (KEGR1), (4) a second correction factor arithmetic-calculation section arithmetically calculating a second correction factor (KEGR2) by comparison of the intake-air flow rate (BQACK) estimated by said intake-air flow rate estimation section with the actual intake-air flow rate (QAC) detected by said air-flow meter, for executing feedback-correction with respect to the basic EGR rate, (5) an EGR rate correction section interrelatively making a first EGR-rate correction based on the first correction factor (KEGR1) and a second EGR-rate correction based on the second correction factor (KEGR2) with respect to the basic EGR rate (MEGRM) to produce the final desired EGR rate (MEGR), and (6) an EGR control section executing exhaust-gas recirculation control on the basis of the final desired EGR rate, so that the EGR rate is regulated to the final desired EGR rate.

2. A method for controlling exhaust-gas recirculation of an internal combustion engine, wherein the engine includes an exhaust-gas recirculation system recycling part of inert exhaust gas back through the engine and having an exhaust-gas-recirculation passage adapted to connect an exhaust manifold with an intake manifold and an exhaust-gas-recirculation control valve device disposed in the exhaust-gas-recirculation passage for regulating an EGR rate, sensors detecting operating conditions of the engine, an air-flow meter detecting an actual intake-air flow rate (QAC), and an electronic control unit configured to be electronically connected to the sensors and the exhaust-gas-recirculation control valve device for automatically regulating the EGR rate to a final desired EGR rate, the method comprising:

arithmetically calculating a basic EGR rate (MEGRM) as a function of a first predetermined engine operating condition of the operating conditions, arithmetically calculating a first correction factor (KEGR1) for the basic EGR rate as a function of a second predetermined engine operating condition of the operating conditions except the first predetermined engine operating condition, estimating an intake-air flow rate (BQACK) from the first predetermined engine operating condition, the basic EGR rate (MEGRM), and the first correction factor (KEGR1), arithmetically calculating a second correction factor (KEGR2) by comparison of the intake-air flow rate (BQACK) estimated by said intake-airflow rate estimation section with the actual intake-air flow rate (QAC) detected by said air-flow meter, for executing feedback-correction with respect to the basic EGR rate, interrelatively making a first EGR-rate correction based on the first correction factor (KEGR1) and a second EGR-rate correction based on the second correction factor (KEGR2) with respect to the basic EGR rate (MEGRM) to produce the final desired EGR rate (MEGR), and executing exhaust-gas recirculation control on the basis of the final desired EGR rate, so that the EGR rate is regulated to the final desired EGR rate.

3. A method for controlling exhaust-gas recirculation of an internal combustion engine, wherein the engine includes an exhaust-gas recirculation system recycling part of inert exhaust gas back through the engine and having an exhaust-gas-recirculation passage adapted to connect an exhaust manifold with an intake manifold and an exhaust-gas-recirculation control valve device disposed in the exhaust-gas-recirculation passage for regulating an EGR rate, sensors detecting operating conditions of the engine, an air-flow meter detecting an actual intake-air flow rate (QAC), and an electronic control unit configured to be electronically connected to the sensors and the exhaust-gas-recirculation control valve device for automatically regulating the EGR rate to a final desired EGR rate,. the method comprising:

arithmetically calculating a basic EGR rate (MEGRM) as a function of a first predetermined engine operating condition of the operating conditions, arithmetically calculating a first correction factor (KEGR1) for the basic EGR rate as a function of a second predetermined engine operating condition of the operating conditions except the first predetermined engine operating condition, arithmetically calculating a basic intake-air flow rate (BQAC) as a function of the first predetermined engine operating condition, estimating a corrected intake-air flow rate (BQACK) from the basic EGR rate (MEGRM), the basic intake-air flow rate (BQAC) and the first correction factor (KEGR1), arithmetically calculating a second correction factor (KEGR2) by comparison of the corrected intake-air flow rate (BQACK) estimated by said corrected intake-air flow rate arithmetic-calculation section with the actual intake-air flow rate (QAC) detected by said air-flow meter, for executing feedback-correction with respect to the basic EGR rate, arithmetically calculating the final desired EGR rate (MEGR) as a product (MEGRM×KEGR1×KEGR2) of the basic EGR rate (MEGRM), the first correction factor (KEGR1), and the second correction factor (KEGR2), and executing exhaust-gas recirculation control on the basis of the final desired EGR rate, so that the EGR rate is regulated to the final desired EGR rate.

4. A method for controlling exhaust-gas recirculation of an internal combustion engine, wherein the engine includes an exhaust-gas recirculation system recycling part of inert exhaust gas back through the engine and having an exhaust-gas-recirculation passage adapted to connect an exhaust manifold with an intake manifold and an exhaust-gas-recirculation control valve device disposed in the exhaust-gas-recirculation passage for regulating an EGR rate, sensors detecting operating conditions of the engine, an air-flow meter detecting an actual intake-air flow rate (QAC), and an electronic control unit configured to be electronically connected to the sensors and the exhaust-gas-recirculation control valve device for automatically regulating the EGR rate to a final desired EGR rate, the method comprising:

arithmetically calculating a basic EGR rate (MEGRM) as a function of a first predetermined engine operating condition indicative parameter of the operating conditions, arithmetically calculating a first correction factor (KEGR1) for the basic EGR rate as a function of a second predetermined engine operating condition indicative parameter of the operating conditions except the first predetermined engine operating condition indicative parameter, arithmetically calculating a basic intake-air flow rate (BQAC) as a function of the first predetermined engine operating condition indicative parameter, arithmetically calculating a basic intake-air flow rate correction factor (A) as a function of both the basic EGR rate (MEGRM) and the first correction factor (KEGR1) under a particular condition where a totally-induced gas flow rate, defined as a sum of an induced fresh-air flow rate and a quantity of exhaust gas recirculated, is kept constant, arithmetically calculating a volumetric-efficiency dependent intake-air flow rate correction factor (CQACC) corresponding to a change in volumetric efficiency, occurring owing to the EGR rate affected by the first correction factor (KEGR1), as a function of the first correction factor, arithmetically calculating a final intake-air flow rate correction factor (Z) as a product (A×CQACC) of the basic intake-air flow rate correction factor (A) and the volumetric-efficiency dependent intake-air flow rate correction factor (CQACC), arithmetically calculating a corrected intake-air flow rate (BQACK) as a product (BQAC×Z) of the basic intake-air flow rate (BQAC) and the final intake-air flow rate correction factor (Z), arithmetically calculating a second correction factor (KEGR2) for the basic EGR rate by comparison of the corrected intake-air flow rate (BQACK) with the actual intake-air flow rate (QAC), arithmetically calculating the final desired EGR rate (MEGR) as a product (MEGRM×KEGR1×KEGR2) of the basic EGR rate (MEGRM), the first correction factor (KEGR1), and the second correction factor (KEGR2), and executing exhaust-gas recirculation control on the basis of the final desired EGR rate, so that the EGR rate is regulated to the final desired EGR rate.

5. An exhaust gas recirculation control system for an internal combustion engine equipped with an exhaust-gas recirculation system that recycles part of inert exhaust gas back through the engine, comprising:

(a) sensors detecting operating conditions of the engine;

(b) an air-flow meter detecting an actual intake-air flow rate (QAC);

(c) an exhaust-gas-recirculation passage adapted to connect an exhaust manifold with an intake manifold;

(d) an exhaust-gas-recirculation control valve device disposed in said exhaust-gas-recirculation passage for regulating an EGR rate; and (e) a control unit configured to be electronically connected to said sensors and said exhaust-gas-recirculation control valve device for automatically regulating the EGR rate to a final desired EGR rate; said control unit comprising (1) a basic EGR rate arithmetic-calculation section arithmetically calculating a basic EGR rate (MEGRM) as a function of a first predetermined engine operating condition of the operating conditions, (2) a first correction factor arithmetic-calculation section arithmetically calculating a first correction factor (KEGR1) for the basic EGR rate as a function of a second predetermined engine operating condition of the operating conditions except the first predetermined engine operating condition, (3) a basic intake-air flow rate arithmetic-calculation section arithmetically calculating a basic intake-air flow rate (BQAC) as a function of the first predetermined engine operating condition, (4) a corrected intake-air flow rate arithmetic-calculation section estimating a corrected intake-air flow rate (BQACK) from the basic EGR rate (MEGRM), the basic intake-air flow rate (BQAC) and the first correction factor (KEGR1), (5) a second correction factor arithmetic-calculation section arithmetically calculating a second correction factor (KEGR2) by comparison of the corrected intake-air flow rate (BQACK) estimated by said corrected intake-air flow rate arithmetic-calculation section with the actual intake-air flow rate (QAC) detected by said air-flow meter, for executing feedback-correction with respect to the basic EGR rate, (6) a final desired EGR rate arithmetic-calculation section arithmetically calculating the final desired EGR rate (MEGR) as a product (MEGRM× KEGR1×KEGR2) of the basic EGR rate (MEGRM), the first correction factor (KEGR1), and the second correction factor (KEGR2), and (7) an EGR control section executing exhaust-gas recirculation control on the basis of the final desired EGR rate, so that the EGR rate is regulated to the final desired EGR rate.

6. The exhaust gas recirculation control system as claimed in claim 5, wherein the first predetermined engine operating condition includes at least one of engine speed and engine load.

7. The exhaust gas recirculation control system as claimed in claim 5, wherein the second predetermined engine operating condition includes engine temperature.

8. The exhaust gas recirculation control system as claimed in claim 5, wherein the comparison of the corrected intake-air flow rate (BQACK) estimated by said corrected intake-air flow rate arithmetic-calculation section with the actual intake-air flow rate (QAC) detected by said air-flow meter is obtained as a ratio (QAC/BQACK) of the actual intake-air flow rate (QAC) to the corrected intake-air flow rate (BQACK), and wherein the second correction factor (KEGR2) for the basic EGR rate is retrieved from a predetermined characteristic map that the second correction factor (KEGR2) increases as the ratio (QAC/BQACK) increases.

9. The exhaust gas recirculation control system as claimed in claim 5, wherein said control unit further comprises an EGR valve opening command arithmetic-calculation section arithmetically calculating an EGR valve opening command value (SEGR) from the final desired EGR rate (MEGR) and the first predetermined engine operating condition, and wherein said EGR control section executes the exhaust-gas recirculation control in response to the EGR valve opening command value (SEGR), so that the EGR rate is regulated to the final desired EGR rate.

10. The exhaust gas recirculation control system as claimed in claim 9, wherein said exhaust-gas-recirculation control valve device comprises an EGR control valve disposed in said exhaust-gas-recirculation passage and a step motor having a driving connection with the EGR valve, and wherein the EGR valve opening command value (SEGR) is calculated as a desired number of angular steps of the step motor.

11. An exhaust gas recirculation control system for an internal combustion engine equipped with an exhaust-gas recirculation system that recycles part of inert exhaust gas back through the engine, comprising:

(a) sensors detecting operating conditions of the engine;

(b) an air-flow meter detecting an actual intake-air flow rate (QAC);

(c) an exhaust-gas-recirculation passage adapted to connect an exhaust manifold with an intake manifold;

(d) an exhaust-gas-recirculation control valve device disposed in said exhaust-gas-recirculation passage for regulating an EGR rate; and
(e) a control unit configured to be electronically connected to said sensors and said exhaust-gas-recirculation control valve device for automatically regulating the EGR rate to a final desired EGR rate; said control unit comprising
   (1) a basic EGR rate arithmetic-calculation section arithmetically calculating a basic EGR rate (MEGRM) as a function of a first predetermined engine operating condition indicative parameter of the operating conditions,
   (2) a first correction factor arithmetic-calculation section arithmetically calculating a first correction factor (KEGR1) for the basic EGR rate as a function of a second predetermined engine operating condition indicative parameter of the operating conditions except the first predetermined engine operating condition indicative parameter,
   (3) a basic intake-air flow rate arithmetic-calculation section arithmetically calculating a basic intake-air flow rate (BQAC) as a function of the first predetermined engine operating condition indicative parameter,
   (4) a basic intake-air flow rate correction factor arithmetic-calculation section arithmetically calculating a basic intake-air flow rate correction factor (A) as a function of both the basic EGR rate (MEGRM) and the first correction factor (KEGR1) under a particular condition where a totally-induced gas flow rate, defined as a sum of an induced fresh-air flow rate and a quantity of exhaust gas recirculated, is kept constant,
   (5) a volumetric-efficiency correction factor arithmetic-calculation section arithmetically calculating a volumetric-efficiency dependent intake-air flow rate correction factor (CQACC) corresponding to a change in volumetric efficiency, occurring owing to the EGR rate affected by the first correction factor (KEGR1), as a function of the first correction factor,
   (6) a final intake-air flow rate correction factor arithmetic-calculation section arithmetically calculating a final intake-air flow rate correction factor (Z) as a product (A×CQACC) of the basic intake-air flow rate correction factor (A) and the volumetric-efficiency dependent intake-air flow rate correction factor (CQACC),
   (7) a corrected intake-air flow rate arithmetic-calculation section arithmetically calculating a corrected intake-air flow rate (BQACK) as a product (BQAC×Z) of the basic intake-air flow rate (BQAC) and the final intake-air flow rate correction factor (Z),
   (8) a second correction factor arithmetic-calculation section arithmetically calculating a second correction factor (KEGR2) for the basic EGR rate by comparison of the corrected intake-air flow rate (BQACK) with the actual intake-air flow rate (QAC),
   (9) a final desired EGR rate arithmetic-calculation section arithmetically calculating the final desired EGR rate (MEGR) as a product (MEGRM× KEGR1×KEGR2) of the basic EGR rate (MEGRM), the first correction factor (KEGR1), and the second correction factor (KEGR2), and
   (10) an EGR control section executing exhaust-gas recirculation control on the basis of the final desired EGR rate, so that the EGR rate is regulated to the final desired EGR rate.

12. The exhaust gas recirculation control system as claimed in claim 11, wherein the first predetermined engine operating condition indicative parameter includes at least one of engine speed and engine load.

13. The exhaust gas recirculation control system as claimed in claim 11, wherein the comparison of the corrected intake-air flow rate (BQACK) with the actual intake-air flow rate (QAC) is obtained as a ratio (QAC/BQACK) of the actual intake-air flow rate (QAC) to the corrected intake-air flow rate (BQACK), and wherein the second correction factor (KEGR2) for the basic EGR rate is retrieved from a predetermined characteristic map that the second correction factor (KEGR2) increases as the ratio (QAC/BQACK) increases.

14. The exhaust gas recirculation control system as claimed in claim 11, wherein the second predetermined engine operating condition indicative parameter includes engine temperature.

15. The exhaust gas recirculation control system as claimed in claim 14, wherein the engine temperature is engine coolant temperature.

* * * * *